(12) United States Patent
Christensen

(10) Patent No.: US 9,983,891 B1
(45) Date of Patent: May 29, 2018

(54) SYSTEMS AND METHODS FOR DISTRIBUTING CONFIGURATION TEMPLATES WITH APPLICATION CONTAINERS

(71) Applicant: Veritas Technologies LLC, Mountain View, CA (US)

(72) Inventor: Aaron Christensen, Apple Valley, MN (US)

(73) Assignee: Veritas Technologies LLC, Mountain View, CA (US)

(*) Notice: Subject to any disclaimer, the term of this patent is extended or adjusted under 35 U.S.C. 154(b) by 0 days. days.

(21) Appl. No.: 15/465,572

(22) Filed: Mar. 21, 2017

(51) Int. Cl.
*G06F 9/445* (2018.01)

(52) U.S. Cl.
CPC .......... *G06F 9/44505* (2013.01); *G06F 8/63* (2013.01)

(58) Field of Classification Search
None
See application file for complete search history.

(56) References Cited

U.S. PATENT DOCUMENTS

| | | | | |
|---|---|---|---|---|
| 9,367,305 | B1 * | 6/2016 | Kumar | G06F 8/30 |
| 2004/0148367 | A1 * | 7/2004 | Takano | G06F 9/44505 709/220 |
| 2017/0115977 | A1 * | 4/2017 | Kim | G06F 8/61 |
| 2017/0228246 | A1 * | 8/2017 | Kotha | G06F 9/45558 |
| 2017/0242617 | A1 * | 8/2017 | Walsh | G06F 3/0644 |
| 2017/0337054 | A1 * | 11/2017 | Parees | G06F 8/60 |

OTHER PUBLICATIONS

Apache Mesos, http://mesos.apache.org, last accessed Jan. 25, 2017.
AWS Lambda, https://aws.amazon.com/lambda/, last accessed Jan. 25, 2017.
Docker container support, last accessed Jan. 25, 2017.
Dray—Docker Workflow Engine, http://dray.it/, last accessed Jan. 25, 2017.

(Continued)

*Primary Examiner* — Philip Wang
(74) *Attorney, Agent, or Firm* — FisherBroyles LLP

(57) ABSTRACT

The disclosed computer-implemented method for distributing configuration templates with application containers may include (i) identifying an application to be deployed in an application container, (ii) maintaining a configuration template comprising at least one configuration setting for the application container and code that transforms the configuration template into a configuration file during deployment of the application, (iii) packaging the configuration template, the code that transforms the configuration template, and the application in a deployment container image, (iv) deploying the deployment container image to a host computing system that comprises a container engine that creates an instance of the deployment container from the deployment container image, and (v) triggering, by the instance of the deployment container, the container engine to use the configuration file generated from the configuration template to configure the application container with the configuration setting. Various other methods, systems, and computer-readable media are also disclosed.

20 Claims, 6 Drawing Sheets

(56) References Cited

OTHER PUBLICATIONS

Docker ETL Rest server github, https://github.com/bmamlin/docker-etl-rest-server, last accessed Jan. 25, 2017.
Docker Nifi github, https://github.com/jdye64/docker-nifi, last accessed Jan. 25, 2017.
Mesos/Chronos github, https://github.com/mesos/chronos, last accessed Jan. 25, 2017.
Apache Nifi for Docker, https://github.com/apiri/dockerfile-apache-nifi, last accessed Jan. 25, 2017.
Coho Data, https://www.cohodata.com/intel, last accessed Jan. 25, 2017.
Iron.io, https://www.iron.io/, last accessed Jan. 25, 2017.
Jenkins and Docker, https://www.cloudbees.com/continuous-delivery/jenkins-docker, last accessed Jan. 25, 2017.
Pachyderm.io, https://www.pachyderm.io/, last accessed Jan. 25, 2017.
Syncsort ETL, last accessed Jan. 25, 2017.
Talend and Docker, last accessed Jan. 25, 2017.
What is Docker?, https://www.docker.com/what-docker, last accessed Jan. 25, 2017.
Docker Swarm product overview, https://www.docker.com/products/docker-swarm, last accessed Feb. 28, 2017.
Kubernetes Basics, https://kubernetes.io/docs/tutorials/kubernetes-basics/, last accessed Feb. 28, 2017.
Attach a volume to a container while it is running; http://jpetazzo.github.io/2015/01/13/docker-mount-dynamic-volumes/, as accessed Feb. 23, 2017 (Jan. 13, 2015); Github.
Manage data in containers; https://docs.docker.com/engine/tutorials/dockervolumes/#/backup-restore-or-migrate-data-volumes, as accessed Feb. 23, 2017 (Sep. 3, 2016); Docker.
Docker—Data Volumes and Data Containers (4); http://www.tricksofthetrades.net/2016/03/14/docker-data-volumes/, as accessed Feb. 23, 2017 (Mar. 14, 2016); Tricks of the Trades.
Understanding Volumes in Docker; http://container-solutions.com/understanding-volumes-docker/, as accessed Feb. 23, 2017 (Jul. 6, 2015); Container Solutions Amsterdam.
Docker mounting volumes on host; http://stackoverflow.com/questions/25311613/docker-mounting-volumes-on-host, as accessed Feb. 23, 2017 (Aug. 14, 2014); stackoverflow.
Understand images, containers, and storage drivers; https://docs.docker.com/engine/userguide/storagedriver/imagesandcontainers/, as accessed Feb. 23, 2017 (Nov. 7, 2015); Docker.
A Not Very Short Introduction to Docker; https://blog.jayway.com/2015/03/21/a-not-very-short-introduction-to-docker/, as accessed Feb. 23, 2017 (Mar. 21, 2015); jayway.
Use data volume containers; https://getcarina.com/docs/tutorials/data-volume-containers/, as accessed Feb. 23, 2017 (Oct. 23, 2015); Rackspace.
What is the differences between Data Scientist Workbench and Knowledge Anyhow Workbench; http://support.datascientistworkbench.com/knowledgebase/articles/738753-what-is-the-differences-between-data-scientist-wor, as accessed Feb. 14, 2017 (Jan. 13, 2016); Big Data University.
Rodeo Basics; http://rodeo.yhat.com/docs/, as accessed Feb. 14, 2017 (Nov. 14, 2015); Rodeo.
Extract, transform, load; https://en.wikipedia.org/wiki/Extract,_transform,_load, as accessed Feb. 14, 2017 (Aug. 15, 2004); Wikipedia.
What is Docker; http://searchitoperations.techtarget.com/definition/Docker; as accessed Jan. 28, 2017.
Platform as a Service; https://en.wikipedia.org/wiki/Platform_as_a_service; as accessed Jan. 28, 2017.
What is Scale out Storage; http://whatis.techtarget.com/definition/scale-out-storage; as accessed Jan. 28, 2017.
Real-Time Data Analysis with Kubernetes, Redis, and BigQuery; https://cloud.google.com/solutions/real-time/kubernetes-redis-bigquery; as accessed Jan. 28, 2017.
Operating-system-level virtualization; https://en.wikipedia.org/wiki/Operating-system-level_virtualization; as accessed Jan. 28, 2017.
Advanced Analytics Products; http://www.sas.com/en_us/software/analytics.html#view-all-products; as accessed Jan. 31, 2017.
Containerized Cloud Analytics—SAS Analytics for Containers; http://www.sas.com/en_us/software/analytics-for-containers.html; as accessed Jan. 31, 2017.
Container Cluster; https://cloud.google.com/container-engine/docs/clusters/#what_is_a_container_cluster; as accessed Jan. 31, 2017.
Object Storage; https://en.wikipedia.org/wiki/Object_storage; as accessed Jan. 30, 2017.
Clustered file system; https://en.wikipedia.org/wiki/Clustered_file_system; as accessed Jan. 30, 2017.
Ryan Schroeder et al.; Systems and Methods for Automatically Linking Data Analytics to Storage; U.S. Appl. No. 15/428,134, filed Feb. 8, 2017.
Wikipedia; Operating-system-level virtualization; https://en.wikipedia.org/wiki/Operating-system-level_virtualization, as accessed on Feb. 14, 2017.
Plugins_volume.md; https://github.com/docker/docker/blob/master/docs/extend/plugins_volume.md, as accessed on Feb. 14, 2017.
Ryan Schroeder et al.; Systems and Methods for Performing Storage Location Virtualization; U.S. Appl. No. 15/432,614, filed Feb. 14, 2017.
Kirk Searls et al.; Systems and Methods for Building an Extract, Transform, Load Pipeline; U.S. Appl. No. 15/431,971, filed Feb. 14, 2017.

* cited by examiner

SYSTEMS AND METHODS FOR DISTRIBUTING CONFIGURATION TEMPLATES WITH APPLICATION CONTAINERS

CROSS REFERENCE TO RELATED APPLICATION

This application incorporates U.S. application Ser. No. 15/465,570 titled, Systems and Methods for Using Dynamic Templates to Create Application Containers, filed 21 Mar. 2017, in its entirety by reference.

BACKGROUND

In the past, large-scale computing projects were limited to individuals and enterprises that owned large physical data centers with towering racks of computers. Now, distributed computing allows anyone with the resources to buy server space to run as many instances of their preferred computing device as desired. Further efficiency improvements have been introduced in the form of application containers that allow administrators to run applications without requiring the resources necessary to simulate an entire virtualized operating system for each virtualized application. Containers may reduce the processing requirements for each application, allowing a greater number of applications to be run on the same host. Containers can be used for anything from short-lived operations lasting minutes to long-lived operations lasting weeks or months, and can be configured to run a wide variety of applications in order to complete a wide variety of computing tasks.

Traditional systems for using containers to complete computing tasks may have a low degree of automation, requiring a user to manually configure and launch each container. To compound the problem, traditional systems for distributing containers to host computing systems may only be capable of distributing container images and may not be capable of distributing any non-default configuration files. The instant disclosure, therefore, identifies and addresses a need for systems and methods for distributing configuration templates with application containers.

SUMMARY

As will be described in greater detail below, the instant disclosure describes various systems and methods for distributing configuration templates with application containers by packaging the configuration template, the code that transforms the configuration template, and the application container into a deployment container image that deploys the application container and configures the application container with the template.

In one example, a computer-implemented method for distributing configuration templates with application containers may include (i) identifying an application to be deployed in an application container that isolates a section of user space of a host computing system from other software while sharing kernel space with the other software, (ii) maintaining a configuration template including at least one configuration setting for the application container and code that transforms the configuration template into a configuration file during deployment of the application, (iii) packaging the configuration template, the code that transforms the configuration template, and the application in a deployment container image that, when processed into a deployment container, also isolates a section of user space of the host computing system from other software while sharing the kernel space with the other software, (iv) deploying the deployment container image to the host computing system that includes a container engine that creates an instance of the deployment container from the deployment container image, and (v) triggering, by the instance of the deployment container, the container engine to use the configuration file generated from the configuration template to configure the application container with the configuration setting.

In some examples, triggering the container engine to use the configuration file generated from the configuration template to configure the application container with the configuration setting may include using a function stored in the configuration template to calculate the value of the configuration setting. In some examples, triggering the container engine to use the configuration file generated from the configuration template to configure the application container with the configuration setting may include determining a path of an external resource on the host computing system based at least in part on data about the external resource stored in the configuration template. Additionally or alternatively, triggering the container engine to use the configuration file generated from the configuration template to configure the application container with the configuration setting may include receiving external input about the configuration setting during deployment of the application container and generating the value of the configuration setting based at least in part on the external input.

In one embodiment, triggering, by the instance of the deployment container, the container engine to use the configuration file generated from the configuration template to configure the application container may include connecting a resource on the host computing system with a resource on the instance of the deployment container. In some embodiments, triggering, by the instance of the deployment container, the container engine to use the configuration file generated from the configuration template to configure the application container with the configuration setting may include triggering, by the code that transforms the configuration template, within the instance of the deployment container, the configuration template to generate the configuration file.

In some embodiments, the deployment container may include a same type of container as the application container. In one embodiment, the configuration file may include a default type of configuration file for the container that cannot generate values for the configuration setting during deployment.

In one embodiment, a system for implementing the above-described method may include (i) an identification module, stored in memory, that identifies an application to be deployed in an application container that isolates a section of user space of a host computing system from other software while sharing kernel space with the other software, (ii) a maintaining module, stored in memory, that maintains a configuration template including at least one configuration setting for the application container and code that transforms the configuration template into a configuration file during deployment of the application, (iii) a packaging module, stored in memory, that packages the configuration template, the code that transforms the configuration template, and the application in a deployment container image that, when processed into a deployment container, also isolates a section of user space of the host computing system from other software while sharing the kernel space with the other software, (iv) a deployment module, stored in memory, that deploys the deployment container image to the host computing system that includes a container engine that creates an instance of the deployment container from the deployment container image, (v) a triggering module, stored in memory, that triggers, by the instance of the deployment container, the container engine to use the configuration file generated from the configuration template to configure the application container with the configuration setting, and (vi) at least one physical processor configured to execute the identification module, the maintaining module, the packaging module, the deployment module, and the triggering module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an application to be deployed in an application container that isolates a section of user space of a host computing system from other software while sharing kernel space with the other software, (ii) maintain a configuration template including at least one configuration setting for the application container and code that transforms the configuration template into a configuration file during deployment of the application, (iii) package the configuration template, the code that transforms the configuration template, and the application in a deployment container image that, when processed into a deployment container, also isolates a section of user space of the host computing system from other software while sharing the kernel space with the other software, (iv) deploy the deployment container image to the host computing system that includes a container engine that creates an instance of the deployment container from the deployment container image, and (v) trigger, by the instance of the deployment container, the container engine to use the configuration file generated from the configuration template to configure the application container with the configuration setting.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
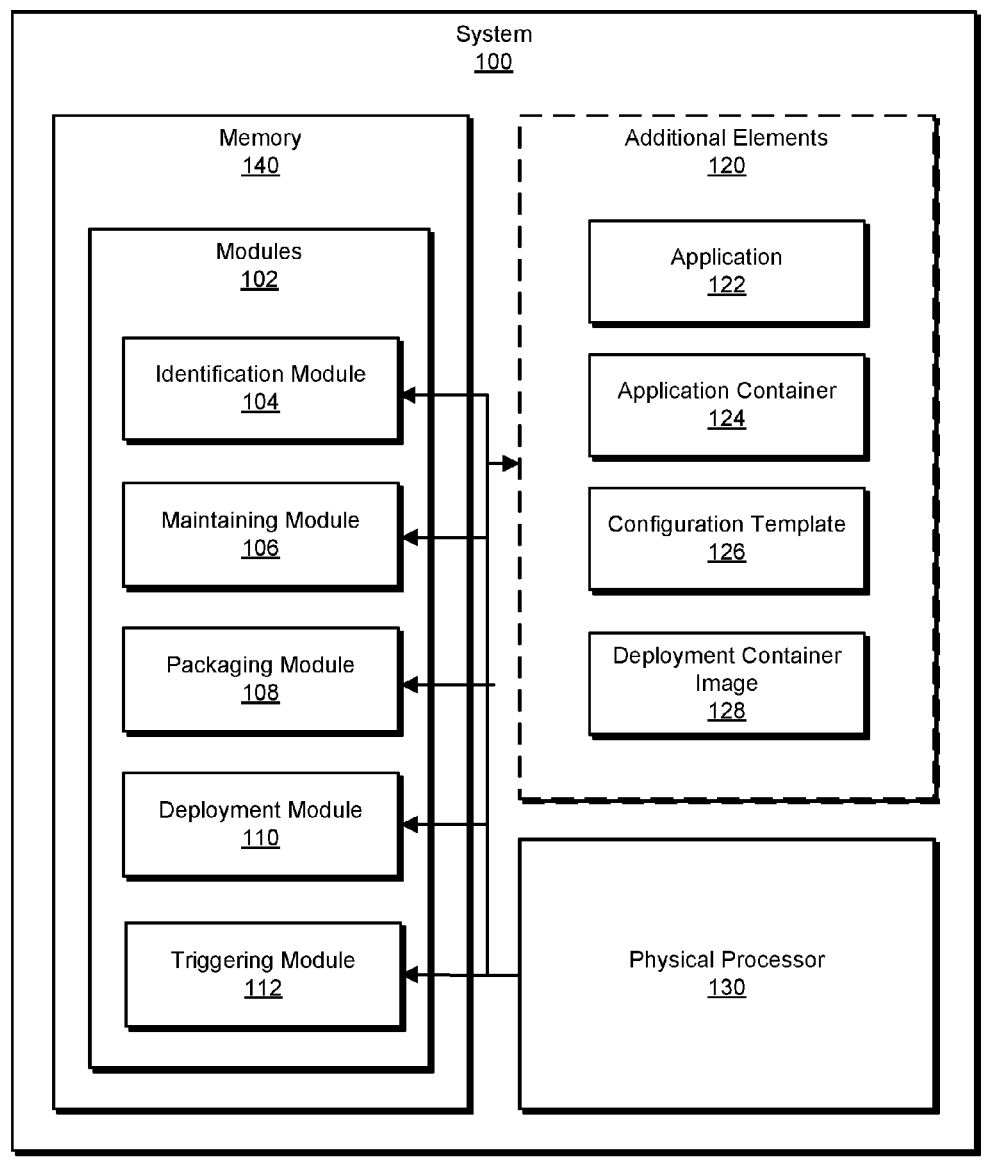
FIG. 1 is a block diagram of an example system for distributing configuration templates with application containers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for distributing configuration templates with application containers. As will be explained in greater detail below, by packaging configuration templates that are capable of calculating settings at run time with containers that will be configured with configuration files generated by the configuration templates, the systems and methods described herein may be able to streamline the distribution and launching of multiple, similar—but not identical—containers across different systems. By using configuration templates and packaging the templates into container images that can be distributed using standard container image distribution systems, the systems and methods described herein may be able to improve the efficiency of the process from a user perspective as well as decrease the computing resources needed to store a large library of static configuration files and/or to separately transfer templates and configuration files. In addition, the systems and methods described herein may improve the functioning of the computing device by enabling the computing device to more efficiently distribute and launch containers by reducing the amount of user intervention required to configure containers.

Figure 2:
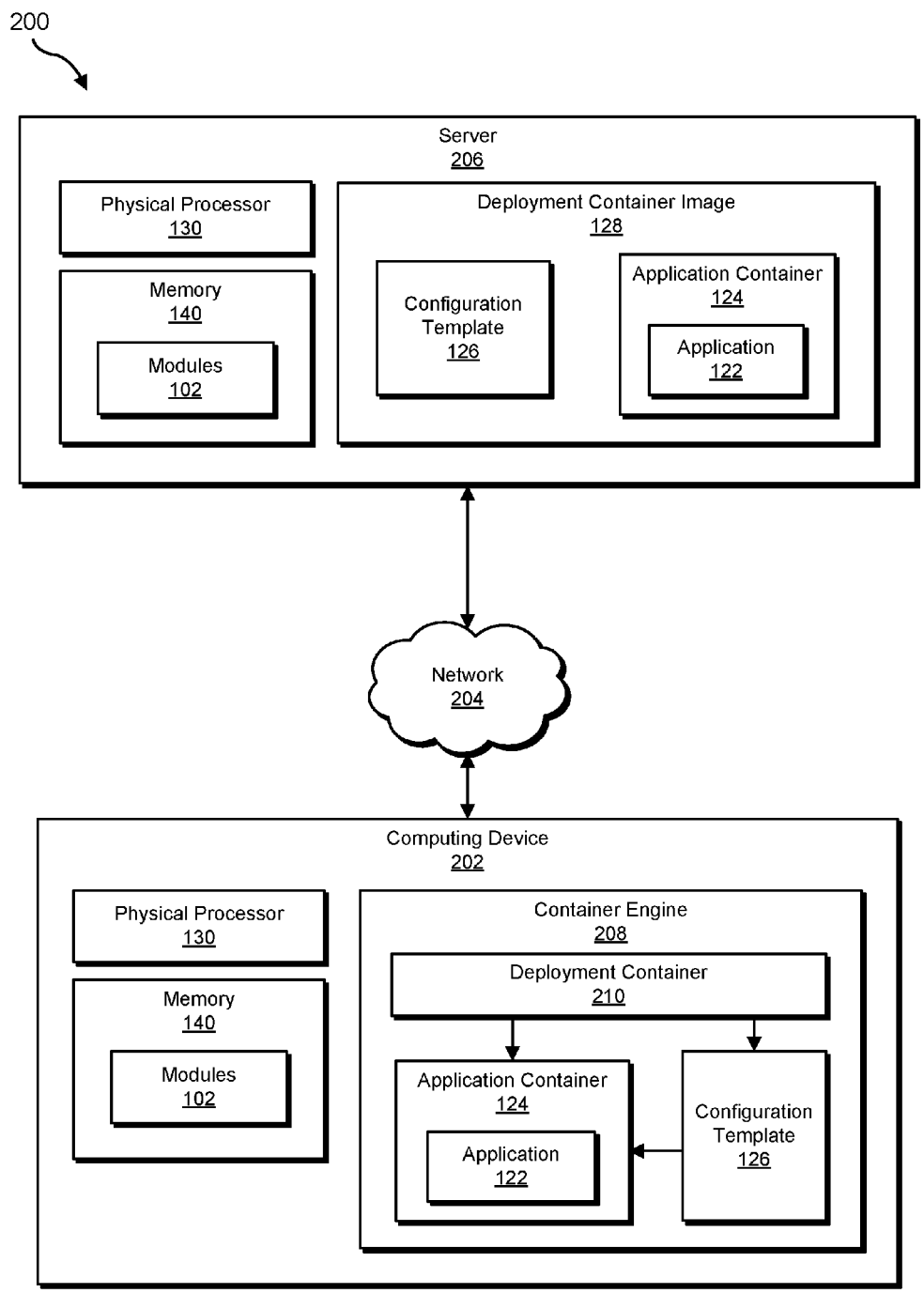
FIG. 2 is a block diagram of an additional example system for distributing configuration templates with application containers.
Figure 3:
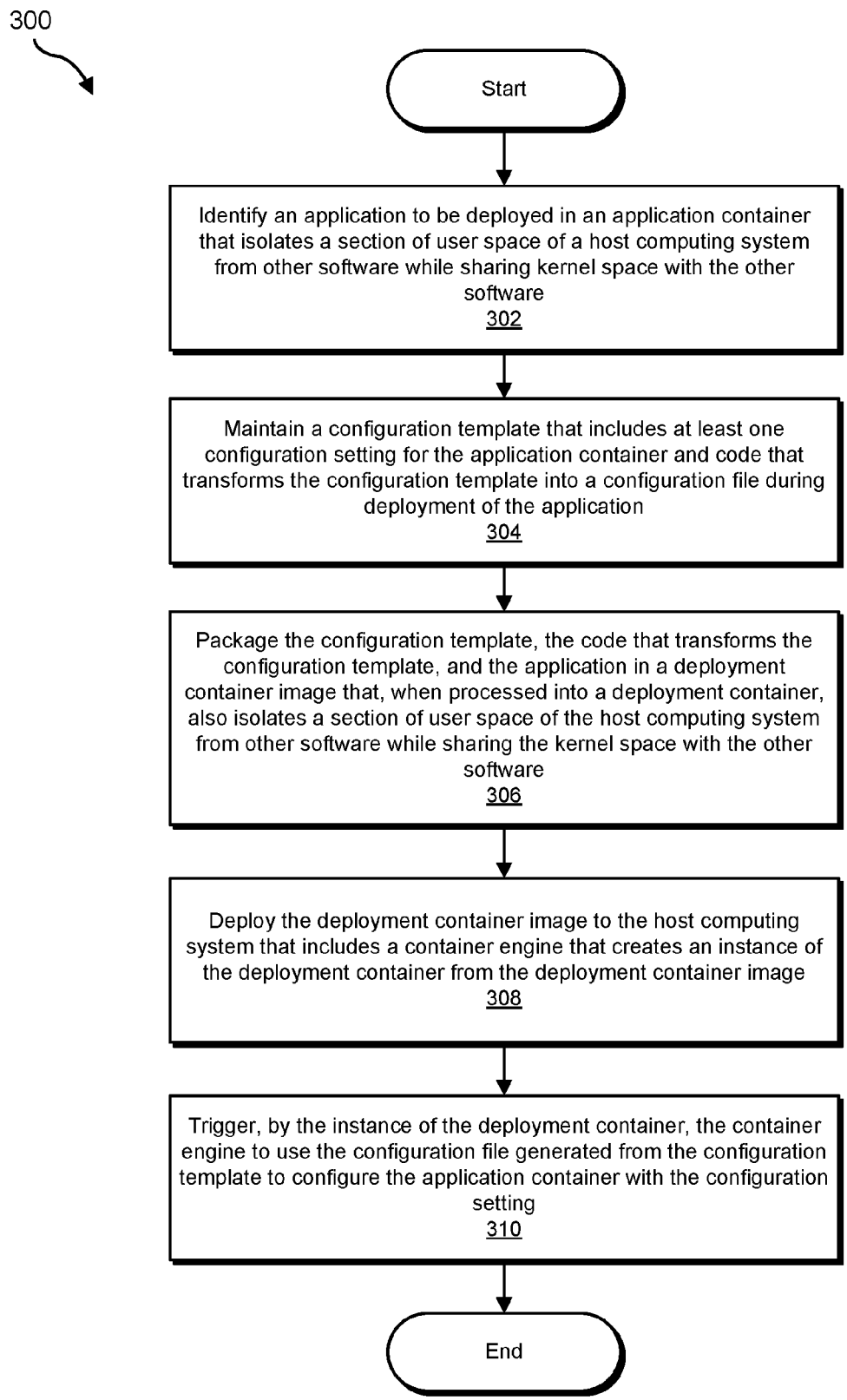
FIG. 3 is a flow diagram of an example method for distributing configuration templates with application containers.
Figure 4:
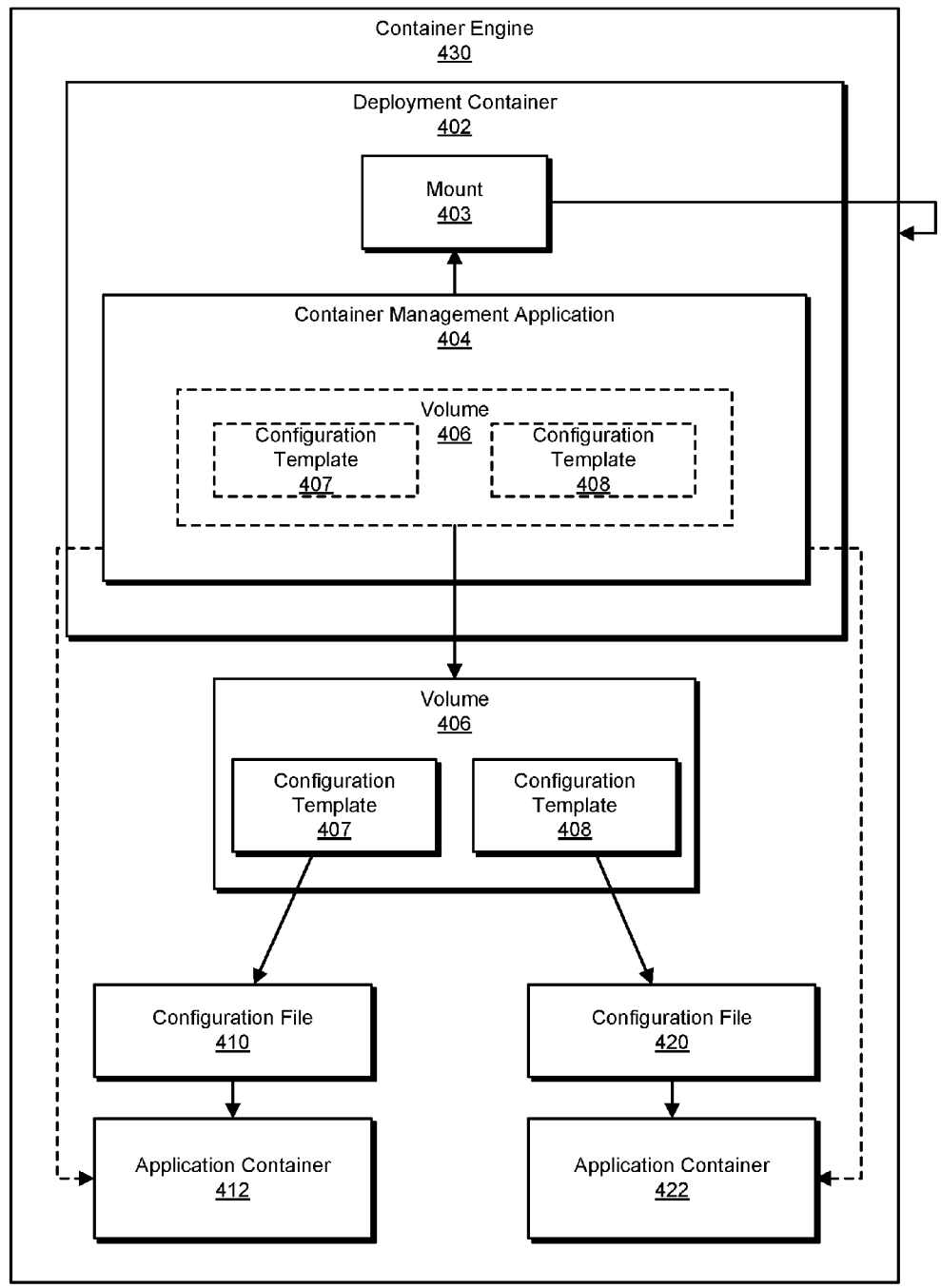
FIG. 4 is a block diagram of an example computing system for distributing configuration templates with application containers.

The following will provide, with reference to FIGS. 1, 2, and 4, detailed descriptions of example systems for distributing configuration templates with application containers. Detailed descriptions of corresponding computer-implemented methods will also be provided in connection with FIG. 3. In addition, detailed descriptions of example files will be provided in connection with FIGS. 5 and 6.

FIG. 1 is a block diagram of example system 100 for distributing configuration templates with application containers. As illustrated in this figure, example system 100 may include one or more modules 102 for performing one or more tasks. For example, and as will be explained in greater detail below, example system 100 may include an identification module 104 that identifies an application to be deployed in an application container that isolates a section of user space of a host computing system from other software while sharing kernel space with the other software. Example system 100 may additionally include a maintaining module 106 that maintains a configuration template that includes at least one configuration setting for the application container and code that transforms the configuration template into a configuration file during deployment of the application. Example system 100 may also include a packaging module 108 that packages the configuration template, the code that transforms the configuration template, and the application in a deployment container image that, when processed into a deployment container, also isolates a section of user space of the host computing system from other software while sharing the kernel space with the other software. Example system 100 may additionally include a deployment module 110 that deploys the deployment container image to the host computing system that includes a container engine that creates an instance of the deployment container from the deployment container image. Example system 100 may also include a triggering module 112 that triggers, by the instance of the deployment container, the container engine to use the configuration file generated from the configuration template to configure the application container with the configuration setting. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate distributing configuration templates with application containers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as application 122, application container 124, configuration template 126, and/or deployment container image 128. Application 122 generally represents any type of application, process, software, and/or script capable of executing within a container. Application container 124 generally represents any type or form of virtualized environment that isolates an application executing within application container 124 from the host operating system without replicating an entire operating system kernel. Configuration template 126 generally represents any means of storing the data and/or code necessary to generate a configuration file for a container. Deployment container image 128 generally represents any type of representation of a container that can be transformed into an executable container.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to distribute configuration templates with application containers.

Computing device 202 generally represents any type or form of computing device capable of reading computer-executable instructions. In some embodiments, computing device 202 may be a host computing system that hosts one or more containers. In one embodiment, computing device 202 may be a remote (i.e., cloud) server. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of storing container images. In some embodiments, server 206 may be a remote (i.e., cloud) server. In some embodiments, an administrator may interact with modules hosted on server 206 via an additional computing device such as a personal computer. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Container engine 208 generally represents any type or form of code, module, script, and/or application that is capable of executing a container on a host computing system. Deployment container 210 generally represents any container that is capable of launching and/or configuring other containers.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for distributing configuration templates with application containers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an application to be deployed in an application container that isolates a section of user space of a host computing system from other software while sharing kernel space with the other software. For example, identification module 104 may, as part of computing device 202 in FIG. 2, identify application 122 to be deployed in application container 124 that isolates a section of user space of a host computing system from other software while sharing kernel space with the other software.

The term "application," as used herein, generally refers to any script, code, process, module, and/or combination of the above that performs at least one computing function. In some embodiments, an application may execute within a container and may only access resources within the container. In other embodiments, an application may execute within a container and may access resources external to the container. Examples of applications include, without limitation, processes that read data, transform data, create data, allow a user to interact with data, and/or store data. In some embodiments, an application may be part of a workflow that extracts data from data storage, transforms the data into a new format, and/or loads the data into a new repository.

The term "container," as used herein, generally refers to any type of virtual environment that does not include an entire operating system but does include enough computing resources to execute at least one process and/or application. In some embodiments, the resources and/or processes within an application container may be isolated from resources and/or processes outside the application container. For example, a container may isolate user space of a deployment system from other software on the deployment system while sharing kernel space with the other software. In some embodiments, a container may execute only a single process and/or application, while in other embodiments, a container may execute multiple processes and/or applications. In some embodiments, a container may be a DOCKER container. In some embodiments, the term "application container" may refer to a container that is intended to execute an application.

The term "user space," as used herein, generally refers to the portion of memory in a computing environment where application software executes. In some embodiments, user space may include libraries, graphics engines, device drivers for certain devices, and/or system daemons. The term "kernel space," as used herein, generally refers to the portion of memory in a computing environment reserved for executing an operating system kernel, kernel extensions, and device drivers. In contrast, virtualization environments that are not containers, such as virtual machines, may not share kernel space with other software. Other forms of application virtualization that are also not containers may share both kernel space and user space with other applications.

Identification module 104 may identify an application to be deployed in a container in a variety of ways and/or contexts. For example, identification module 104 may identify a container image that is configured to execute the application when deployed. The term "container image," as used herein, generally refers to any way of storing a container, data describing a container, and/or data within a container that can be reconstructed into an executing container but is not itself an executing container. In some embodiments, a container image may be a compressed file that contains data necessary to execute the container. In another example, identification module 104 may identify a file that is capable of launching a process and/or application. For example, identification module 104 may identify an EXE file used to launch a process on a WINDOWS operating system. In another example, identification module 104 may identify a script file that, when compiled by the proper compiler, will launch a process.

In some embodiments, identification module 104 may also identify a container distribution system that will distribute the application container to the host computing system. In some embodiments, the container distribution system may be capable of distributing container images to various computing systems but may not be capable of distributing files other than container images and/or connecting container images with related files. In one embodiment, identification module 104 may identify DOCKER CLOUD as a container distribution system that will be used to transmit a container image to the host computing system.

At step 304, one or more of the systems described herein may maintain a configuration template including at least one configuration setting for the application container and code that transforms the configuration template into a configuration file during deployment of the application. For example, maintaining module 106 may, as part of computing device 202 in FIG. 2, maintain configuration template 126 including at least one configuration setting for application container 124 and code that transforms configuration template 126 into a configuration file during deployment of application 122.

The term "configuration template," as used herein, generally refers to any file, code, and/or data that is designed to generate a configuration file that includes one or more configuration settings that define at least a portion of an operating environment of a container. In some embodiments, a configuration setting may be a variable configuration setting that does not have a fixed static value. In some embodiments, a configuration template may include functions, loops, variables, argument-defined parameters, and/or other methods of dynamically calculating settings. In some embodiments, a configuration template may also include one or more static settings. In some embodiments, a configuration template may also include static default values that may be used for variable configuration settings if the variable configuration settings are not externally specified when the dynamic template is processed.

The term "configuration setting," as used herein, generally refers to any setting for a configuration file. In some examples, a configuration setting may be a static setting that has a fixed static value. In other examples, the configuration setting may be a variable setting that is not static. In some examples, a variable setting may be calculated by a programmatic function. In other examples, a variable setting may be inputted by arguments to a file and/or function. Additionally or alternatively, a variable setting may be determined by the environment in which the file with the variable setting is hosted. Examples of variable settings may include, without limitation, host ports, storage settings, paths to external services and/or resources, runtime parameters for a service, usernames, passwords, hostnames, and/or image files used by services. In some embodiments, a variable setting in a configuration file may include a setting and/or parameter that defines a container, a host system of a container, and/or an application executing in a container.

The term "configuration file," as used herein, generally refers to any file that contains at least one variable that configures an application executing in a container and/or defines at least a portion of the operating environment and/or configuration for a container and that contains only static variables that cannot be dynamically calculated at run time. In some embodiments, a configuration file may contain variables that may allow for substitutions at run time, such as BASH environmental variables, but may not be capable of performing more complicated calculations than substitution. In one embodiment, the configuration file may be a default type of configuration file for the container. In some examples, a configuration file may be a DOCKER-COMPOSE.YML file for a DOCKER container. Additionally or alternatively, a configuration file may be a NGINX.CONF file.

Maintaining module 106 may maintain the configuration template in a variety of ways. For example, maintaining module 106 may include a repository of configuration templates designed to be used with containers in various contexts. In some embodiments, maintaining module 106 may include a graphical user interface that enables an administrator to create, update, and/or delete configuration templates. In other embodiments, maintaining module 106 may enable an administrator to interact with configuration templates via a command line interface.

In some embodiments, maintaining module 106 may maintain a template processing tool that is capable of processing configuration templates into configuration files. In some embodiments, the template processing tool may be capable of creating external resources on host computing systems such as networks, volumes, and/or databases.

At step 306, one or more of the systems described herein may package the configuration template, the code that transforms the configuration template, and the application in a deployment container image that, when processed into a deployment container, also isolates a section of user space of the host computing system from other software while sharing the kernel space with the other software. For example, packaging module 108 may, as part of computing device 202 in FIG. 2, package configuration template 126, the code that transforms configuration template 126, and application 122 in deployment container image 128 that, when processed into deployment container 210, also isolates a section of user space of the host computing system from other software while sharing the kernel space with the other software.

Packaging module 108 may package the code and files in a variety of ways and/or contexts. For example, packaging module 108 may configure a container image file to contain one or more configuration templates, code that transforms the configuration templates, and/or code that initiates an application and/or application container. In some examples, packaging module 108 may package additional files into the deployment container image. For example, packaging module 108 may package configuration files that are not configuration templates. In other examples, packaging module 108 may package files that will be accessed by the application executing in the application container, such as data files.

In one embodiment, packaging module 108 may package the code and/or files into an image of a container that is the same type of container as the application container. For example, the deployment container may be a DOCKER container and the application container may also be a DOCKER container.

At step 308, one or more of the systems described herein may deploy the deployment container image to the host computing system that may include a container engine that creates an instance of the deployment container from the deployment container image. For example, deployment module 110 may, as part of computing device 202 in FIG. 2, deploy deployment container image 128 to the host computing system that may include container engine 208 that creates an instance of deployment container 210 from deployment container image 128.

The term "container engine," as used herein, generally refers to any system, application, process, script, and/or code capable of executing a container on a host computing system. In some embodiments, a container engine may be capable of performing a variety of functions related to hosting containers, such as mounting resources, communicating with the host computing system, communicating with a container, launching containers, unpacking containers from images, and/or configuring containers. In one embodiment, the container engine may be the DOCKER container engine.

Deployment module 110 may deploy the deployment container image to the host computing system in a variety of ways. For example, deployment module 110 may deploy the deployment container image to the host computing system via a container image distribution system. In one embodiment, deployment module 110 may deploy the deployment container image via DOCKER CLOUD.

At step 310, one or more of the systems described herein may trigger, by the instance of the deployment container, the container engine to use the configuration file generated from the configuration template to configure the application container with the configuration setting. For example, triggering module 112 may, as part of computing device 202 in FIG. 2, trigger, by the instance of deployment container 210, container engine 208 to use the configuration file generated from configuration template 126 to configure application container 124 with the configuration setting.

Triggering module 112 may trigger the container engine to use the configuration file to configure the application container in a variety of contexts. For example, triggering module 112 may automatically trigger the deployment container to begin the process of initializing and configuring the application container as soon as the deployment is launched. In another example, triggering module 112 may receive a message from an administrator indicating that triggering module 112 should trigger the container engine to configure the application container.

In some embodiments, triggering module 112 may trigger the container engine to configure the application container by causing the deployment container to perform a series of steps. As illustrated in FIG. 4, a deployment container 402 may execute a container management application 404 that may store data used to deploy and/or configure application containers.

In one embodiment, triggering module 112 may trigger, by the instance of the deployment container, the container engine to use the configuration file generated from the configuration template to configure the application container by connecting a resource on the host computing system with a resource on the instance of the deployment container. For example, container management application 404 may create mount 403 that connects deployment container 402 to the host computing system and enables deployment container 402 to send commands to container engine 430. In one embodiment, mount 403 may represent a mount of "/var/run/docker.sock" from the host operating system to "/var/run/docker.sock" in deployment container 402. Mount 403 may allow container management application 404 to make requests of container engine 430. In some examples, container management application 404 may then declare the directory holding configuration template 407 and/or configuration template 408 to be volume 406. In some embodiments, volume 406 may be given a temporary volume stored with other local volumes in container engine 430 and/or may appear in a list of volumes associated with deployment container 402 when an inspect operation is performed. In one example, container management application 404 may use the DOCKERFILE VOLUME command to create volume 406.

In some embodiments, container management application 404 may then retrieve the container identifier (ID) for deployment container 402. In some examples, container management application 404 may retrieve the container ID from the "/proc/self/cgroup" file. In other examples, container management application 404 may retrieve the container ID from the $HOSTNAME variable. Container management application 404 may then use the container ID in a call to an application programming interface (API) to retrieve metadata about deployment container 402. In one embodiment, container management application 404 may make an inspect call to the DOCKER API. In some embodiments, container management application 404 may retrieve the mount entry for volume 406 via an API call. Container management application 404 may then find the source value for the mount entry for volume 406, which may be the directory on the host computing system that contains the local version of volume 406 that stores configuration templates 407 and/or 408.

Next, container management application 404 may provide the location of volume 406 as a parameter to configuration template 407 and/or configuration template 408 while triggering configuration template 407 and/or configuration template 408 to generate configuration files 410 and/or 420, respectively. Container management application 404 may also send a command to container engine 430 to initialize application containers 412 and/or 422 and configure application containers 412 and/or 422 with configuration files 410 and/or 420, respectively. In some embodiments, container management application 404 may use a DOCKER-COMPOSE file to configure application containers 412 and/or 422.

In some examples, the systems described herein may override a pre-existing configuration file within the container with the new configuration file. For example, application container 412 may be stored in an image that is configured with a NGINX.CONF configuration file. In this example, the systems described herein may configure the application executing in application container 412 with configuration file 410, which may also be a NGINX.CONF file that may override the stored NGINX.CONF file. In some examples, configuration file 410 may contain different values for settings than the stored configuration file. For example, configuration file 410 may have different values for concurrent connections, port numbers, and/or other settings. In some examples, configuration file 410 may include dynamically calculated values calculated for configuration file 410 by configuration template 407. In other examples, configuration file 410 may include only static values.

In some embodiments, the application executing in application container 412 may expect multiple configuration files. For example, the application may expect an NGINX.INI file, a NGINX.DEFAULTS file, and/or a NGINX.CONF. In one embodiment, the systems described herein may provide instances of all of the configuration files expected by the application even if not all of the configuration files are different from stored versions in the application container image. In one example, the systems described herein may provide identical copies of NGINX.INI and/or NGINX.DEFAULTS to the instances of those files stored within the application container image but may provide a different copy of NGINX.CONF to the NGINX.CONF file stored within the application container image.

In some embodiments, the systems described herein may be hosted on a server in a cluster (e.g., SWARM and/or KUBERNETES). In these embodiments, container management application 404 may map a named volume onto an application container that is distributed and shared throughout the cluster. When the application starts, the systems described herein may copy configuration files for the application onto the named volume at the directory where the named volume is mounted. In this embodiment, container management application 404 may perform similar steps to those described above with the exception that container management application 404 may retrieve the name of the named volume rather than the source of the volume. In this embodiment, container management application 404 may then pass the name of the named volume as a parameter to the code that transforms the configuration template into the configuration file, which may declare the named volume as an external volume and/or map the named volume to the directory where the files are stored. In some examples, container management application 404 may create a different named volume for each configuration template and/or configuration file in order to enable the code that transforms the configuration templates and/or code that configures the application container to more easily locate the correct file. For example, container management application 404 may label the named volume using a naming convention that indicates which files will be stored on the named volume.

Container management application 404 generally represents any script, process, module, application, and/or code that is capable of creating and/or configuring application containers from within a deployment container. In some embodiments, container management application 404 may include the code that transforms configuration templates 407 and/or 408 into configuration files 410 and/or 420. In some embodiments, container management application 404 may perform additional tasks such as initializing application containers, terminating application containers, and/or interacting with data produced by application containers.

Container management application 404 may use the configuration templates to generate the configuration files that configure the application containers in a variety of ways. In one embodiment, triggering module 112 may trigger, by the instance of the deployment container, the container engine to use the configuration file generated from the configuration template to configure the application container with the configuration setting by triggering, by the code that transforms the configuration template, within the instance of the deployment container, the configuration template to generate the configuration file. In some examples, the code that transforms the configuration template may calculate values for all of the variable settings in the configuration template and then may create a static configuration file that includes the calculated values. In some embodiments, the code that transforms the configuration template may launch and/or create resources specified in the configuration template. For example, the code that transforms the configuration template may launch and/or create a database, open a network connection, launch an application, create an external volume, and/or launch and/or configure a service.

Figure 5:
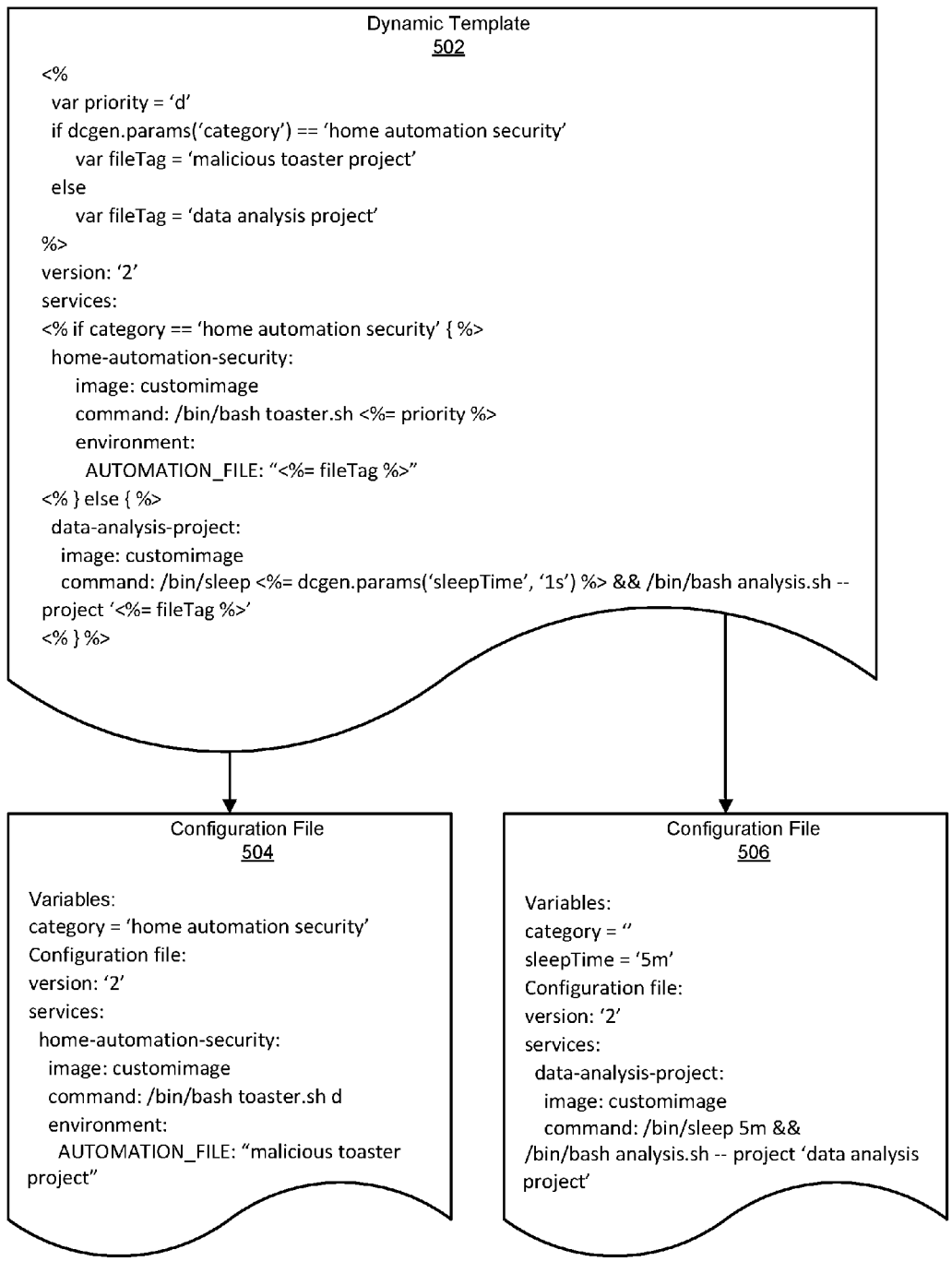
FIG. 5 is a block diagram of example files.

In some examples, the code that transforms the configuration template may process a configuration template with multiple variable settings that are generated in multiple ways. For example, as illustrated in FIG. 5, a configuration template 502 may include static setting "version" and may also include several variable settings. In this example, the systems described herein may search the code block for the variable "priority" in order to set the value of the variable "priority." In some examples, the systems described herein may receive an external input for a function stored within the configuration template to determine the value of a variable setting. In this example, the systems described herein may receive external input about the "category" variable. If the category is "home automation security," the systems described herein may determine, based on the code stored in the configuration template, that the "fileTag" variable setting value is "malicious toaster project." If the category is not "home automation security," the systems described herein may set the value of the "fileTag" variable setting to "data analysis project." In some embodiments, the systems described herein may receive values directly from external input. For example, configuration template 502 may receive a value for the "sleepTime" setting directly from external input entered when the systems described herein process configuration template 502.

In some examples, the code that transforms the configuration template into the configuration file may process configuration template 502 into a configuration file 504. In this example, configuration file 504 may have static values for all of the variable configuration settings, based on the values calculated by the systems described herein at the time that processing module 110 processed dynamic template 502. For example, configuration file 504 may have a "category" value of "malicious toaster project," launch a container from the "customimage" image, and run the bash script "toaster.sh" with a specified priority based on input received by processing module 110 and used to create configuration file 504 from dynamic template 502. In some examples, configuration file 504 may also include an environment variable "AUTOMATION FILE."

In another example, processing module 110 may process dynamic template 502 into configuration file 506 in response to different input for the variable configuration settings. In this example, if "category" is something other than "home automation security," the systems described herein may start two containers. One of the two containers may also use "customimage," but may run "/bin/sleep" rather than "toaster.sh." In this example, "/bin/sleep" may use the "sleepTime" variable that was specified by a user and/or may use a default value of "1s" if "sleepTime" was not specified by a user. After executing "/bin/sleep," the systems described herein may run the "analysis.sh" command. In some embodiments, a configuration file may also be linked to a second container that may be launched to perform services such as data analysis. For example, the "data-analysis-project" service may run "/bin/sleep" to wait for the data analysis service container to fully launch so that "analysis.sh" can run and make use of the data analysis service.

Figure 6:
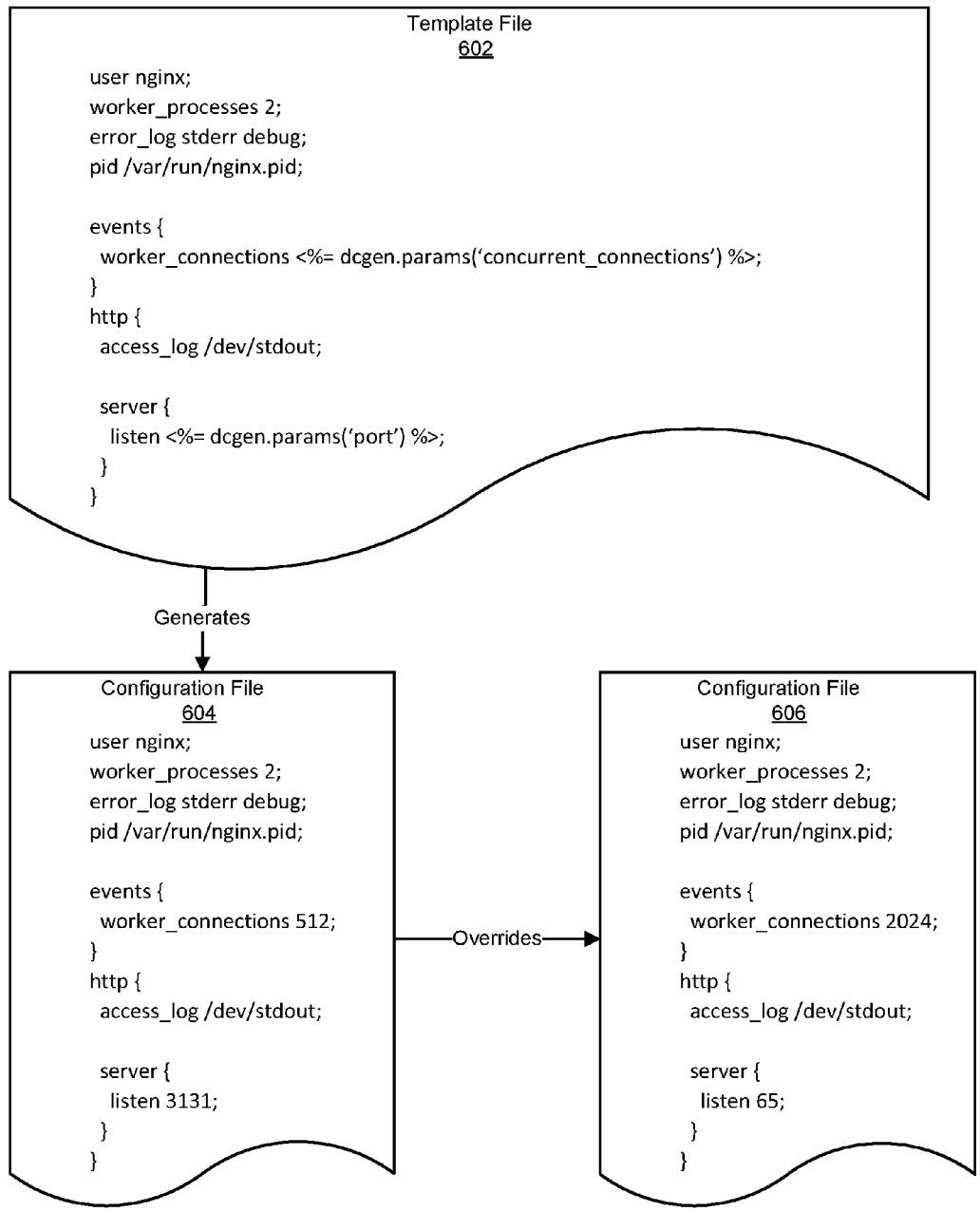
FIG. 6 is a block diagram of example files.

In some embodiments, the systems described herein may use a template file to generate a configuration file that overrides an existing configuration file. For example, as illustrated in FIG. 6, a template file 602 may include static and/or variable settings for an NGINX.CONF file. In one example, template file 602 may have variable settings for "worker_connections" and/or "listen." In some examples, the systems described herein may provide the values "512" and/or "3131" to template file 602 to generate a configuration file 604 that has a "worker_connections" value of "512" and a "listen" value of "3131." In this example, an application and/or application container configured with configuration file 604 may create up to 512 worker connections and/or may listen on port 3131. In some examples, the application and/or application container may already be configured with a configuration file, such as configuration file 606. In one embodiment, configuration file 606 may be part of an application container image. In some examples, configuration file 606 may have different values for some settings than configuration file 604. In some example, configuration file 604 may override configuration file 606, configuring the application and/or container with the values in configuration file 604 rather than the values in configuration file 606. In one example, configuration file 604 may configure the application and/or application container to listen on port 3131 rather than on port 65, as specified in configuration file 606.

As described in connection with method 300 above, the systems and methods described herein may distribute configuration files with application container images by packaging the configuration files and the application container image into a deployment container image that also contains code that will execute and configure the application container on the host system to which the files are deployed. By packaging configuration files with container images in this way, the systems described herein may enable users to use standard container distribution systems to deploy container images that can be configured with custom configuration files after deployment, rather than requiring users to reconfigure the image with the new configuration files before deployment and/or use a non-standard distribution system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for distributing configuration templates with application containers, at least a portion of the method being performed by a computing device comprising at least one hardware processor, the method comprising:
   identifying an application to be deployed in an application container that isolates a section of user space of a host computing system from other software while sharing kernel space with the other software;
   maintaining a configuration template comprising at least one configuration setting for the application container and code that transforms the configuration template into a configuration file during deployment of the application;
   packaging the configuration template, the code that transforms the configuration template, and the application in a deployment container image that, when processed into a deployment container, also isolates a section of user space of the host computing system from other software while sharing the kernel space with the other software;
   deploying the deployment container image to the host computing system that comprises a container engine that creates an instance of the deployment container from the deployment container image; and
   triggering, by the instance of the deployment container, the container engine to use the configuration file generated from the configuration template to configure the application container with the configuration setting.

2. The computer-implemented method of claim 1, wherein triggering the container engine to use the configuration file generated from the configuration template to configure the application container with the configuration setting comprises using a function stored in the configuration template to calculate a value of the configuration setting.

3. The computer-implemented method of claim 1, wherein triggering the container engine to use the configuration file generated from the configuration template to configure the application container with the configuration setting comprises determining a path of an external resource on the host computing system based at least in part on data about the external resource stored in the configuration template.

4. The computer-implemented method of claim 1, wherein triggering the container engine to use the configuration file generated from the configuration template to configure the application container with the configuration setting comprises:
   receiving external input about the configuration setting during deployment of the application container; and
   generating a value of the configuration setting based at least in part on the external input.

5. The computer-implemented method of claim 1, wherein triggering, by the instance of the deployment container, the container engine to use the configuration file generated from the configuration template to configure the application container comprises connecting a resource on the host computing system with a resource on the instance of the deployment container.

6. The computer-implemented method of claim 1, wherein triggering, by the instance of the deployment container, the container engine to use the configuration file generated from the configuration template to configure the application container with the configuration setting comprises triggering, by the code that transforms the configuration template, within the instance of the deployment container, the configuration template to generate the configuration file.

7. The computer-implemented method of claim 1, wherein the deployment container comprises a same type of container as the application container.

8. The computer-implemented method of claim 1, wherein the configuration file comprises a default type of configuration file for the container that cannot generate values for the configuration setting during deployment.

9. A system for distributing configuration templates with application containers, the system comprising:
   an identification module, stored in memory, that identifies an application to be deployed in an application container that isolates a section of user space of a host computing system from other software while sharing kernel space with the other software;
   a maintaining module, stored in memory, that maintains a configuration template comprising at least one configuration setting for the application container and code that transforms the configuration template into a configuration file during deployment of the application;
   a packaging module, stored in memory, that packages the configuration template, the code that transforms the configuration template, and the application in a deployment container image that, when processed into a deployment container, also isolates a section of user space of the host computing system from other software while sharing the kernel space with the other software;
   a deployment module, stored in memory, that deploys the deployment container image to the host computing system that comprises a container engine that creates an instance of the deployment container from the deployment container image;
   a triggering module, stored in memory, that triggers, by the instance of the deployment container, the container engine to use the configuration file generated from the configuration template to configure the application container with the configuration setting; and
   at least one physical processor configured to execute the identification module, the maintaining module, the packaging module, the deployment module, and the triggering module.

10. The system of claim 9, wherein the triggering module triggers the container engine to use the configuration file generated from the configuration template to configure the application container with the configuration setting by using a function stored in the configuration template to calculate a value of the configuration setting.

11. The system of claim 9, wherein the triggering module triggers the container engine to use the configuration file generated from the configuration template to configure the application container with the configuration setting by determining a path of an external resource on the host computing system based at least in part on data about the external resource stored in the configuration template.

12. The system of claim 9, wherein the triggering module triggers the container engine to use the configuration file generated from the configuration template to configure the application container with the configuration setting by:
   receiving external input about the configuration setting during deployment of the application container; and
   generating a value of the configuration setting based at least in part on the external input.

13. The system of claim 9, wherein the triggering module triggers, by the instance of the deployment container, the container engine to use the configuration file generated from the configuration template to configure the application container by connecting a resource on the host computing system with a resource on the instance of the deployment container.

14. The system of claim 9, wherein the triggering module triggers, by the instance of the deployment container, the container engine to use the configuration file generated from the configuration template to configure the application container with the configuration setting by triggering, by the code that transforms the configuration template, within the instance of the deployment container, the configuration template to generate the configuration file.

15. The system of claim 9, wherein the deployment container comprises a same type of container as the application container.

16. The system of claim 9, wherein the configuration file comprises a default type of configuration file for the container that cannot generate values for the configuration setting during deployment.

17. A non-transitory computer-readable medium comprising one or more computer-readable instructions that, when executed by at least one processor of a computing device, cause the computing device to:
   identify an application to be deployed in an application container that isolates a section of user space of a host computing system from other software while sharing kernel space with the other software;
   maintain a configuration template comprising at least one configuration setting for the application container and code that transforms the configuration template into a configuration file during deployment of the application;

package the configuration template, the code that transforms the configuration template, and the application in a deployment container image that, when processed into a deployment container, also isolates a section of user space of the host computing system from other software while sharing the kernel space with the other software;

deploy the deployment container image to the host computing system that comprises a container engine that creates an instance of the deployment container from the deployment container image; and trigger, by the instance of the deployment container, the container engine to use the configuration file generated from the configuration template to configure the application container with the configuration setting.

18. The non-transitory computer-readable medium of claim 17, wherein the one or more computer-readable instructions cause the computing device to trigger the container engine to use the configuration file generated from the configuration template to configure the application container with the configuration setting by using a function stored in the configuration template to calculate a value of the variable configuration setting.

19. The non-transitory computer-readable medium of claim 17, wherein the one or more computer-readable instructions cause the computing device to trigger the container engine to use the configuration file generated from the configuration template to configure the application container with the configuration setting by determining a path of an external resource on the host computing system based at least in part on data about the external resource stored in the configuration template.

20. The non-transitory computer-readable medium of claim 17, wherein the one or more computer-readable instructions cause the computing device to trigger the container engine to use the configuration file generated from the configuration template to configure the application container with the configuration setting by:

receiving external input about the configuration setting during deployment of the application container; and generating a value of the configuration setting based at least in part on the external input.

* * * * *